United States Patent [19]

Neefe

[11] 4,159,292

[45] Jun. 26, 1979

[54] METHOD OF CONTROLLING THE RELEASE OF A CAST PLASTIC LENS FROM A RESINOUS LENS MOLD

[75] Inventor: Charles W. Neefe, Big Spring, Tex.

[73] Assignee: Neefe Optical Lab. Inc., Big Spring, Tex.

[21] Appl. No.: 875,865

[22] Filed: Feb. 7, 1978

Related U.S. Application Data

[63] Continuation-in-part of Ser. No. 793,388, May 25, 1977, abandoned.

[51] Int. Cl.² .................. B29D 11/00; B29C 1/04
[52] U.S. Cl. ............................ 264/1; 264/126; 264/225; 264/337; 264/338
[58] Field of Search ............... 264/1, 130, 225, 337, 264/338, 126

[56] References Cited

U.S. PATENT DOCUMENTS

| 3,423,488 | 1/1969 | Bowser | 264/225 |
| 3,821,333 | 6/1974 | Goodwin | 264/1 |
| 3,935,292 | 1/1976 | Okubo et al. | 264/1 |

FOREIGN PATENT DOCUMENTS

39-6835  5/1964  Japan ..................... 264/130

*Primary Examiner*—James B. Lowe

[57] ABSTRACT

Controlling the release of cast polymeric optical lenses from a resinous optical mold by coating the resinous mold material particles with a release agent before forming the resinous material into a lens mold.

1 Claim, No Drawings

METHOD OF CONTROLLING THE RELEASE OF A CAST PLASTIC LENS FROM A RESINOUS LENS MOLD

Continuation-in-part application Ser. No. 793-388, filed, May 25, 1977, now abandoned, entitled: A METHOD OF MAKING HIGH QUALITY PLASTIC LENSES.

PRIOR ART

The use of plastic materials for making optical lenses has increased rapidly for the past ten years. This is due to the availability of better plastic materials and the physical advantages of the plastic resins for specific application, such as ophthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high, due to the problems caused by the shrinkage of the monomer when polymerized, which often breaks the expensive molds.

The current lens molds are fabricated from glass, each mold is individually ground and polished to the required specifications. To achieve accurate reproduction of the bifocal and lenticular molds is most difficult and expensive. This new process makes possible exact reproductions and has many other distinct advantages which will become apparent from the following disclosure.

An object is to provide a process for making inexpensive molds which may be made to identical specifications.

Another object is to provide a process whereby standard masters may be used to produce a large quantity of replica molds.

THE LENSES ARE MADE AS FOLLOWS

A master positive mold having the curvature required on the finished lens is made from glass, stainless steel or other materials which withstand the molding pressures and temperature. Materials which may be electroplated or plated by vacuum disposition have also been used.

PREFERRED EMBODIMENT

The master positive mold is placed in a sleeve, a molding grade of a resinous material such as polyimide, polycarbonate, polymethylpentene, polyethylene, polypropylene, or other molding material is also placed in the sleeve. The sleeve and it's contents are heated to the softening point of a molding material, pressure is applied to form the negative lens mold. The sides of the master mold have been cut to a smaller diameter than the sleeve to provide an opening around the mold. When sufficient heat and pressure have been applied the molding compound will fill the area around the positive mold forming a cup-like cavity with a curved optical surface at the bottom. Either injection or compression molding may be used to produce the negative resinous mold. A liquid or syrup monomer material containing a suitable catalyst is placed over the optical surface of the mold and covered to prevent evaporation of the monomer. The liquid monomer is polymerized within the mold to form a solid monolithic mass. Ultraviolet light, microwave energy or heat may be used to speed the polymerization process. Thermosetting and crosslinked hard materials may be used to produce lenses which are very dimensionally stable and could not be made by injection or compression molding. This process is also suitable for the production of soft contact lenses made from Hydroxyethyl Methacrylate which cannot be made by compression or injection molding techniques.

It is not necessary to remove the hardened plastic lens material from the mold before cutting the convex curve. The mold may be placed in a suitable lathe or grinding machine and the second curvature cut and polished. The finished lens now has a molded concave surface and a convex curvature which was cut and polished without being removed from the disposable mold. The mold has served as a container for the monomer and provided the molded optical surface which may be aspheric or may be composed of two or more spherical segments. The cup-like mold also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The mold also serves as a holding fixture during the polishing operation. The lens is supported by the optical surface present on the mold, therefore the lens material must adhere strongly to the supporting mold in order to withstand the forces of cutting and polishing. After the lens is processed to the required specifications, the lens is removed by sharply flexing the holding fixture, separating the finished optical lens from it's support. The lens must release from the mold without placing sufficient stress to damage the lens. The release may be controlled by:

1. Selecting the material from which the lens mold is made.

2. By coating the lens mold with a release agent.

3. By treating the resinous mold material particles with a release agent before forming the material into a lens mold. The surface coating of the particles of resinous material will greatly effect the release of polymeric materials cast in the mold. During the heating and melting cycle the release agent present on the surface of the particles of the resinous mold material will be forced to the surface of the closed mold cavity. The melting particles fuse together to form a homogenous plastic mass leaving the release agent on the surface. Examples of release agents for this application are, silicone oil, polyvinyl alcohol, steric acid, fluorocarbons and waxes. The application may be by disolving the release agent in a solvent and immersion the resinous particles in the solvent followed by evaporating the solvent to leave the release agent on the surface of the resinous particles. A preferred method of application in the fluidized bed consisting of a cylinder having a perforated bottom through which compressed air is admitted. The resinous particles of acrylic, are placed in the cylinder and the release agent, Silicone Oil 87-X66, supplied by RAM Chemicals, is added to the compressed air which carries the silicone oil to the surface of the acrylic particles. No further drying or processing is required. The release agent will be active on the surface.

Various modifications can be made without departing from the spirit of this invention or the scope of the appended claims. The constants set forth in this disclosure are given as examples and in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of controlling the release of a cast polymeric lens from a resinous lens mold by the steps of selecting a granular resinous molding material, coating the surface of each granule of said granular resinous material with a selected release agent, applying sufficient heat and pressure within a closed mold to fuse the resinous particles into the form of a lens mold having an optical surface, the selected release agent being present on the optical surface of said resinous lens mold, casting a liquid monomer in the resinous mold covering the optical surface, polymerizing the liquid monomer to form a solid monolitic mass having a molded optical lens surface in contact with the release agent present on the surface of the resinous lens mold, removing the lens from the resinous mold.

* * * * *